United States Patent [19]

Randle

[11] Patent Number: 5,787,403
[45] Date of Patent: Jul. 28, 1998

[54] BANK-CENTRIC SERVICE PLATFORM, NETWORK AND SYSTEM

[75] Inventor: William M. Randle, Bexley, Ohio

[73] Assignee: Huntington Bancshares, Inc., Columbus, Ohio

[21] Appl. No.: 401,075

[22] Filed: Mar. 8, 1995

[51] Int. Cl.⁶ .................................................. G06F 17/60
[52] U.S. Cl. .......................... 705/43; 705/42; 705/35; 235/380; 348/1
[58] Field of Search .................. 264/401 R, 401 N, 264/408; 375/91, 93, 90; 310/825.23; 335/375, 382, 383, 380; 395/183.2, 200.2, 200.7, 200.9, 925; 348/13, 14, 15; 365/243, 242, 235, 239; 705/43, 42, 35, 39

[56] References Cited

U.S. PATENT DOCUMENTS

| | | | |
|---|---|---|---|
| 5,084,816 | 1/1992 | Boese et al. | 395/183.2 |
| 5,220,501 | 6/1993 | Lawlor et al. | 379/90 |
| 5,383,113 | 1/1995 | Kight et al. | 364/401 |
| 5,482,139 | 1/1996 | Rivalto | 235/383 |
| 5,485,370 | 1/1996 | Moss et al. | 364/408 |
| 5,544,086 | 8/1996 | Davis et al. | 364/408 |

*Primary Examiner*—Curtis Kuntz
*Assistant Examiner*—Paul Loomis
*Attorney, Agent, or Firm*—Porter, Wright, Morris & Arthur

[57] ABSTRACT

A banking service platform is provided that enables bank-centric access and control by a customer at a remote location of financial information, products and services maintained by a bank at a central location and provides an access gateway from the bank to non-bank information, products and services of providers not otherwise related to the bank.

18 Claims, 2 Drawing Sheets

BANK-CENTRIC SERVICE PLATFORM, NETWORK AND SYSTEM

FIELD OF THE INVENTION

This invention relates to a bank-centric network identifying a bank as a central service provider to a customer and is designed to provide user access, presentation and gateway functions that permit a customer to communicate with product providers through a financial institution. The network is customer-accessed and associated with a conventional bank or financial institution and provides conventional financial information, products and services offered by a bank and is a gateway to other "non-bank" information, products and services via a banking service platform. More particularly, a banking service platform is provided that includes a client server interconnected with the centralized information processor of a conventional financial institution or bank and a customer operable transceiver to provide access to bank and non-bank products, while maintaining a bank as a focus of the customer's affinity.

BACKGROUND AND SUMMARY OF THE INVENTION

An increasing number of people are demanding more convenience to access various types of consumer services, including banking, bill paying, shopping, travel and other products and services. Catering to the demand for added convenience in banking services are ATMs, direct deposit and banking by telephone and mail. Financial institutions are now seeing competition from a host of new non-financial institution competitors, ranging from investment firms with expanding menus of services to software manufacturers, which have sought to position themselves as primary providers of financial services via electronic access. Financial institutions may continue to hold the money, but these new non-financial institution competitors seek to control the customers.

The banking industry, reacting to this transformation of the competitive environment, has hurried to established electronic connectivity with customers—in some cases choosing systems quickly without sufficient consideration of the strategic value or long-term vitality of the particular technology involved. Even though some of these systems seem to offer "control" of customer relationships, they leave much activity in the hands of a third party provider that is not a financial institution, and these systems actually weaken the relationship link between the financial institution and its customers.

There is a need for a system that enables financial institutions to retain control of customer relationships and customer loyalty and identification with a bank yet enables the customer to use the most advanced technology available. The present invention provides such a system as a bank-centric service platform. The banking service platform is a unique, fault-tolerant, scalable distributed computing environment that puts advanced technology directly into the control of the financial institution, with the same plug-and-play efficiency of third party non-financial institution options. With the present invention, the financial institution, and not a third party non-financial institution provider, is the central focus of the customer's relationship and the bank becomes the perceived and actual provider of financial information, products and services to the customer; and the customer's bank becomes the branded gateway to a plurality of banking and non-banking information, products and services, that, but for the gateway, would not otherwise be offered by the bank.

In present third party provider systems, the customer calls the third party to do his/her banking; and because the third party owns and manages a facility to enable the customer to obtain electronic services via the third party, the third party becomes in effect the customer's "bank." The relational affinity of the customer's actual bank with which the customer has an account fades in the customer's view as the third party service provider becomes identified as the first relationship the customer uses to initiate transactions.

The banking service platform of the present invention allows the financial institution to own and manage the system and to control and manage the flow of information between the financial institution and the customer. The relationship between the financial institution and the customer is direct and personal. The present invention also allows the financial institution to become a gateway identified with the bank name to non-banking information, products and services.

A banking service platform is provided that enables access by a customer at a remote location to financial information, products and services maintained by a bank at a central location. The banking service platform includes a central information processor at the central location of a bank, which, ordinarily, is the bank's master computer. The central information processor includes data storage files relating to categories of bank financial information, products and services and an access gateway to other providers (non-bank) of financial and non-financial information, products and services. Customer operable transceivers at remote locations send and receive communications to and from the central information processor through a client server that is operatively interconnected to communicate with the transceivers and the central information processor. The client server handles processing and transmitting communications to and from the customer operable transceivers. The client server enables a customer using the transceiver to access and control items within the categories of financial information, products and services maintained in the data storage files of the central information processor and the financial and non-financial information, products and services of other providers accessible through the gateway.

DETAILED DESCRIPTION OF THE INVENTION AND THE PREFERRED EMBODIMENT

Figure 1:
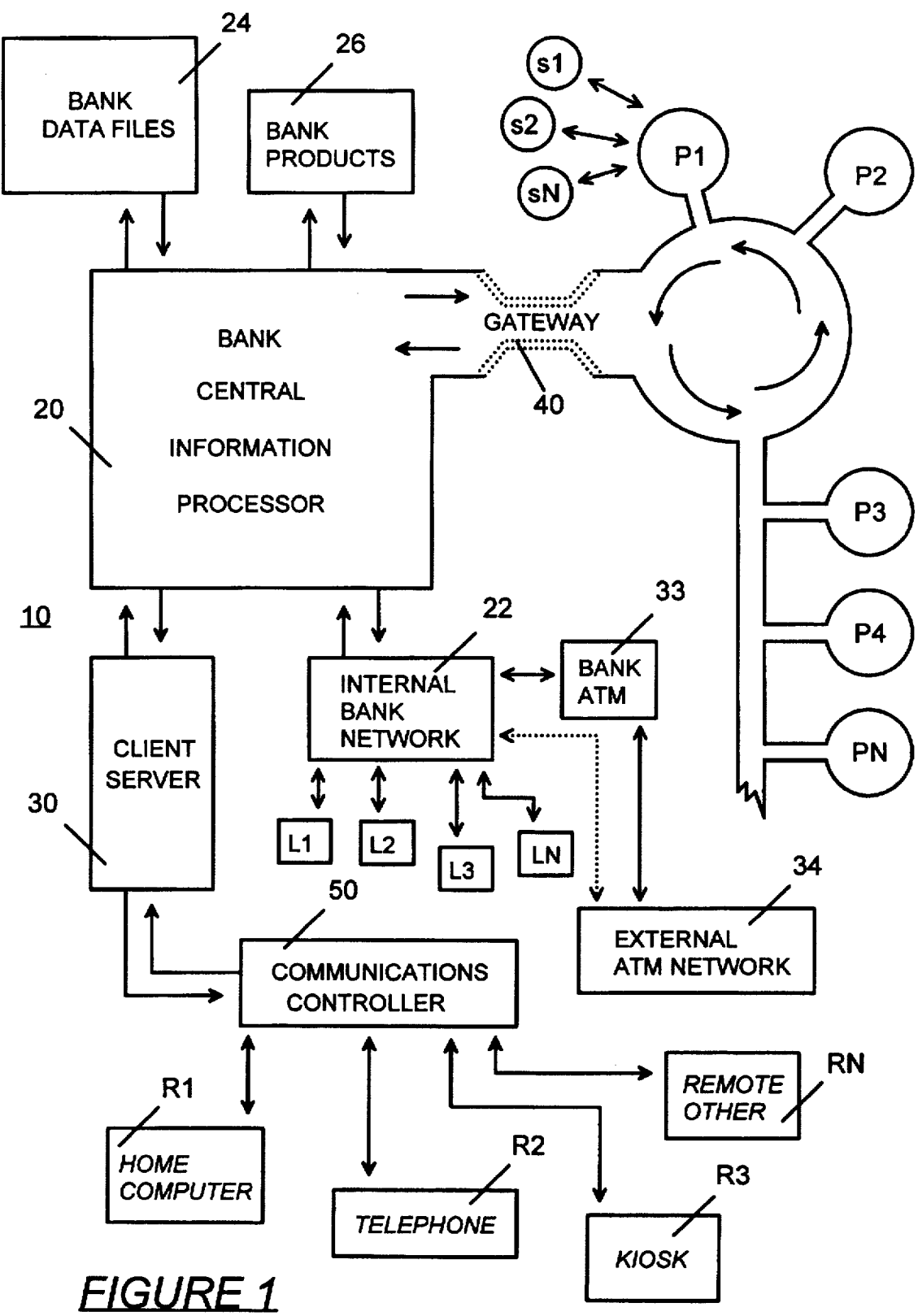
FIG. 1 is an overall system flow chart of the bank-centric service platform of the present invention.
Figure 2:
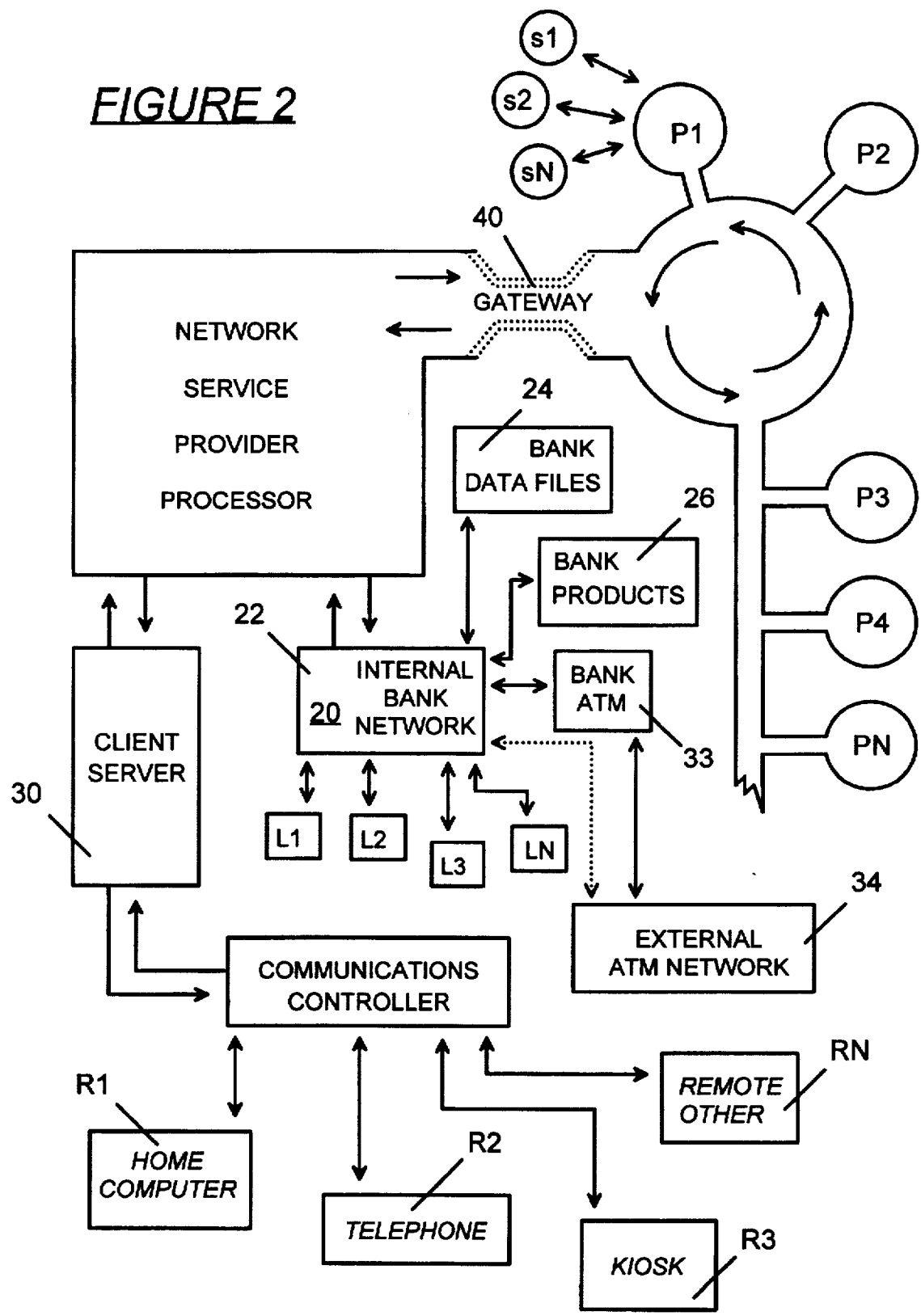
FIG. 2 is an overall system flow chart of a network service platform embodiment of the present invention.

FIG. 1 is an overall flow chart showing, in general fashion, the interrelationship of certain functional and operative components of the banking service platform, generally designated 10. The banking service platform 10 includes a client server 30 in front of the financial institution's mainframe computer or central information processor 20. The banking service platform 10 is networked with other platforms, even those installed in different operating environments to provide a gateway 40 to traditionally non-bank products and services. The banking service platform 10 connects to the financial institution's existing databases through a software wrapper around the financial institution's existing system(s), that may be a main frame, distributed network, or other central system. The need for costly, time-consuming re-coding is eliminated. Thus, the financial institution's banking service platform 10 can include all of the products and services that the financial institution develops or that the financial institution selects from available options of information, products and services. These options may include bill payment, brokerage, investment, catalog shopping, travel and others. The financial institution or bank retains control over the options it makes available to customers through the banking service platform 10.

A financial institution's present, in place, central information processor 20 typically includes data storage files relating to categories of financial information, products and services that are bank originated. These files may include bank data files (e.g., customer and account information) 24, data about bank financial products 26, and other internal files of the financial institution related to its bank function. The central information processor 20 may also be interconnected with an internal bank network 22 that is linked to various other locations L1, L2, L3, . . . , LN, e.g., bank branch offices, bank officer's desktops, or the bank's own ATMs 33, or the bank's network affiliation of ATMs etc., 34, to provide information about customers, accounts, and bank products and/or services. The central information processor may include means for debiting and crediting accounts upon receipt of instructions or signals, and for recording information thereof in the data files. The central information processor 20 also includes an access gateway 40 to other, typically non-bank, providers P1, P2, P3, . . . , PN of financial and non-financial products and services, not otherwise directly provided by the bank. One or more of these providers such as P1 may also be interconnected with other providers s1, s2, . . . , sN to allow access to financial and non-financial information, products and services of these sub-providers.

The bank-centric service platform 10 enables access by a customer at a remote location to conventional financial information, products and services offered by the bank and maintained by the bank's central information processor in addition to other providers of financial and non-financial information, products and services such as travel, shopping and the like not otherwise directly offered by the bank in the absence of the gateway connection. This access is accomplished via the access gateway 40 of the central information processor 20.

The customer obtains access to financial and non-financial information, products and services via customer operable transceivers (R1, R2, R3, . . . , RN) at remote locations. The transceiver used in this application includes any electronic device that can transmit and/or receive communications, including, inter alia, standard telephone, smart telephone, computer, PC, interactive television, video banking machine, ATM, point of sale terminals, video phone, TDD device and other data input/output devices. A client server 30 is operatively interconnected through communication controller 50 to communicate with the transceivers R1, . . . , RN and the central information processor 20. The client server 30 handles processing and transmitting communications to and from the customer operable transceivers R1, . . . . RN and enables a customer using the transceivers R1, . . . , RN to access and control items within the categories of financial information, products and services maintained in the data storage files of the central information processor 20 of the bank and the financial and non-financial products and services of other providers P1, P2, . . . , PN that are accessible through the gateway 40 interconnected with bank central processor 20. As noted, the banking service platform 10 may also include a communications controller 50 interconnected to the client server 30 and the transceivers R1, . . . . RN to route communications between said transceiver R1 . . . , RN and said client server 30.

The banking service platform 10 enables a financial institution to provide a broad array of business banking services, Including a client server 30 network between the customer interface and the bank central information processor eliminates the need to re-code data in existing systems and makes the delivery of complex business services, such as remote check processing and image and statement retrieval, as easy to implement as basic consumer services.

The banking service platform 10 is designed to operate as a distributed computing environment to give a financial institution a proprietary bank-centric network with the fast, cost-efficient plug-and-play availability offered by third-party vendors. The banking service platform 10 of the present invention is also scalable, fault-tolerant, secure and evolvable; the banking service platform 10 absorbs and accommodates voice, data and video access devices, and may take advantage of further advances in new areas such as computer telephony as they are developed. The present invention enables financial institutions to provide a gateway 40 to the providers P1, P2, P3, P4, . . . , PN of many financial and non-financial information, products and services, such as brokerage, travel, shopping, etc. Unlike third-party systems that limit a customer's offering to those that the third party can develop, the banking service platform 10 of the present invention allows a financial institution to plug into other existing products and services almost anywhere in the marketplace at almost any time, and offer these products and services to the financial institution's customers. Once the banking service platform 10 is in place, the financial institution can create and implement its own new products and services to meet the financial institution's marketing objectives while maintaining a direct relational connection with the customer in the bank's own identity.

Current cardcentric systems offer only basic functions, such as balance inquiry, transaction information, funds transfer and bill payment (through a non-financial services company vendor). The banking service platform 10 of the present invention is an open-ended structure that enables a financial institution to provide the services that cardcentric systems can provide as well as many more current and new services. Besides balance inquiry, transaction information, funds transfer and bill payment, the present invention enables a financial institution to provide bill payment through a financial services company vendor or a non-financial services company vendor. The present invention also enables a financial institution to provide access to brokerage investment, brokerage information, loan applications, loan account reviews, commercial banking, other financial products and services available from third parties, non-financial products and services that the financial institution's customers may desire, from ordering pizza or flowers to purchasing jewelry and planning a honeymoon— and any service that the financial institution considers to be commercially desirable to its customers.

The banking service platform 10 is a scalable, distributed environment in which the service platform removes the networking function from the costly, time-consuming, disruptive arena of hardware installation, reporting of data and all of the other difficulties that are typically involved in creating a proprietary network. The banking service platform 10 will run with a variety of hardware, or combination of hardware, that is in use today or may be installed in the future. The banking service platform 10 will network smoothly among a variety of operating systems, a financial institution can use data from UNIX, NT and OS/2 environments simultaneously—joining it with voice and video transmission at the same time—through the banking service platform 10. The design of the present invention makes the banking service platform 10 scalable; even a small or mid-size bank can affordably make these services available to a relative small base of customers. At the same time, the platform 10, with appropriate adaptations, can grow to serve millions of users simultaneously, initiating millions of transactions with substantially continuous availability.

In the past, fault-tolerant systems have been developed that ensure that the system will not shut down. These systems comprise a complete, parallel tandem system that can pick up for the main system in a few seconds. Unfortunately, this significantly increases hardware and software costs, and transactions can still be lost if the failure is in any part of the network other than the fault-tolerant node. The banking service platform 10 embeds fault-tolerance in the software, creating a low-cost synchronous transition, so the financial institution does not lose a transaction. With the present invention, the financial institution can rely on a high percent availability and reliability in the network links and nodes.

The banking service platform 10 also includes means for encryption at one or more levels of the interconnection and relationship of the platform to secure a direct and relational connection between a customer, bank and third party. Thus, the financial institution's customers can be assured that their electronic transactions and communications are safe and secure and that their accounts are protected.

The banking service platform 10 is evolvable with the capability to enable a financial institution to create and offer products and services unique to the financial institution. These new products and services can then be compatible with the banking service platform 10 to enable the financial institution's customers to access and use these new products and services. The banking service platform is operated and controlled by the financial institution and has the capability to operate across a wide range of bandwidths. The banking service platform 10 is accessible via narrow bandwidth transmissions for customers who wish to use traditional telephones or early smart phones. The platform 10 can also fully utilize the potential of wide bandwidth transmission. The banking service platform 10 may be video-ready, and, as access devices become available to consumers, accessible from video kiosks, video phones and interactive TV monitors. A financial institution with the banking service platform 10 may offer live video conferencing simultaneously with real-time data transmission. This allows a customer of the financial institution with the system to have fill access to a banking experience at any time, from a remote location, as complete as if the customer walked into a branch office of the financial institution and received in-person customer attention.

The banking service platform 10 provides a flexible, robust service environment to create and add new products and services off-line or on-line. New products and services are downloadable from the platform 10. The gateway 40 may be available for video networks such as the 155 m/sec ATM/SONET (video) Network. The banking service platform 10 enables customers to use financial and non-financial information, products and services accessible through the gateway 40, which include catalog ordering and other transactions with a third party whereby the cost of an order or transaction placed by a customer is concurrently charged in real to time the customer's account at the financial institution that has the customer relationship with the bank, as a result of means in the bank central information processor for identifying and debiting that customer's account with respect to instructions regarding particular transactions.

Having described the invention in detail, those skilled in the art will appreciate that, given the present disclosure, modifications may be made to the invention without departing from the spirit of the inventive concept herein described. Therefore, it is not intended that the scope of the invention be limited to the specific and preferred embodiments illustrated and described. Rather, it is intended that the scope of the invention be determined by the appended claims.

What is claimed is:

1. A bank-centric service platform that enables access by a bank customer at a remote location to financial information, products and services maintained by a bank at a central location and to financial and non-financial information, products and services of other providers accessible through the bank, said banking service platform comprising:

a central information processor at the central location of a bank, said processor including data storage files relating to bank customers and accounts as the bank maintains these files in the ordinary course and categories of financial information, products and services conventionally offered by the bank;

a branded access gateway interconnected to the bank central information processor providing communication with other providers of financial and non-financial information, products and services with which a bank customer may initiate a transaction, the branded access gateway being controlled by the bank and having characteristics uniquely associated with the bank;

a client server operatively interconnected to communicate with customer operable transceivers at remote locations, said client server enabling live videoconferencing between the bank and a customer substantially simultaneously with real-time data transmission between said customer operable transceiver and said central information processor through said client server, said client server processing communications to and from said customer operable transceivers, and enabling a customer using the transceiver to access and control items in, and perform transactions with respect to, information products and services of the bank in the data storage files of the central information processor and to access the financial and non-financial information, products and services of other providers that are accessible through the branded gateway from said central information processor and to initiate transactions therewith.

2. The banking service platform of claim 1 wherein said transceiver is one of the group consisting of a telephone, smart telephone, computer, ATM point of sale terminal, interactive television, video banking machine, video phone, TDD device and other data input/output devices.

3. The banking service platform of claim 1 further including security means preventing unauthorized access to said service platform from said customer operable transceiver.

4. The banking service platform of claim 2 further including an encryption means controlling access with respect to the platforms at one or more of the relationships between the transceiver, the client server, the bank central information processor, the gateway and third party providers and sub-providers.

5. The banking service platform of claim 1 wherein categories of financial information, products and services available to a bank customer comprise one or more of the group consisting of balance inquiry, transaction information, funds transfer, bill payment, brokerage investment, brokerage information, loan applications, loan account review, commercial banking, and the gateway connects to financial and non-financial products and services available from third parties.

6. The banking service platform of claim 1 wherein said client server includes the capability to serve a plurality of customers simultaneously.

7. The banking service platform of claim 1 wherein new services are downloadable from said client server to said customer operable transceiver.

8. The banking service platform of claim 1 wherein new services can be created and/or changed on-line.

9. The bank-centric service platform of claim 1 further including a real-time resource consumption indicator for real-time billing to the bank customer for the products and services provided.

10. The bank-centric service platform of claim 1 wherein the financial and non-financial information, products and services accessible through the branded access gateway include means whereby the cost of an order or transaction placed by a customer is charged to the customer's account at the bank.

11. The bank-centric service platform of claim 5 including financial and non-financial information, products and services accessible through the branded access gateway and further including means interconnected with the bank central information processor whereby the cost of an order or transaction placed by a bank customer is charged to a customer's account at the bank for payment.

12. The banking service platform of claim 1 further comprising a communications controller interconnected to said client server and said transceiver to route communications between said transceiver and said client server.

13. A network service platform that enables access by a customer at a remote location to financial information, products and services maintained by a bank at a central location and to financial and non-financial information, products and services of other providers accessible through the network comprising:

a central information processor at the central location of a bank, said processor including data storage file relating to bank-customers and accounts as the bank maintains these files in the ordinary course and categories of financial information, products and services conventionally offered by the bank;

a network processor interconnected to the central information processor at the bank and providing a branded network access gateway for communication with other providers of financial and non-financial information, products and services with which a bank customer may initiate a transaction; the branded access gateway being controlled by the bank and having characteristics uniquely associated with the bank;

a client server operatively interconnected to communicate with customer operable transceivers at remote locations, said client server enabling live videoconferencing between the bank and a customer substantially simultaneously with real-time data transmission between said customer operable transceiver and said central information processor through said client server, said client server processing communications to and from said customer operable transceivers, and enabling a bank customer using the transceiver to access and control items in, and perform transactions with respect to, information products and services of the bank in the data storage files of the bank central information processor and to access the financial and non-financial information, products and services of other providers that are accessible through the network access gateway.

14. The platform of claim 13 including an interconnection between the central information processor at the bank and the service provider processor for the network access gateway.

15. The network service platform of claim 13 further comprising a communications controller interconnected to said client server and said transceiver to route communications between said transceiver and said client server.

16. The network service platform of claim 13 wherein categories of financial information, products and services available to a bank customer comprise one or more of the group consisting of balance inquiry, transaction information, funds transfer, bill payment, brokerage investment, brokerage information, loan applications, loan account review, commercial banking, and the gateway connects to financial and non-financial products and services available from third parties.

17. The network service platform of claim 16 including financial and non-financial information, products and services accessible through the gateway and further including means interconnected with the network service provider processor whereby the cost of an order or transaction placed by a customer is charged to a customer's account at the bank or another account.

18. The network service platform of claim 13 wherein said transceiver is one of the group consisting of a telephone, smart telephone, computer, ATM point of sale terminal, interactive television, video banking machine, video phone, TDD device and other data input/output devices.

* * * * *